(12) United States Patent
Rand et al.

(10) Patent No.: US 7,520,483 B2
(45) Date of Patent: Apr. 21, 2009

(54) ADJUSTABLE LEVELING PEDESTAL FOR A FREE-STANDING OBJECT

(75) Inventors: Austin Rand, Vancouver (CA); Enn Erisalu, White Rock (CA); Ron Aloni, legal representative, Vancouver (CA)

(73) Assignee: Ilana Aloni, White Rock (CA)

( * ) Notice: Subject to any disclaimer, the term of this patent is extended or adjusted under 35 U.S.C. 154(b) by 335 days.

(21) Appl. No.: 10/543,773

(22) PCT Filed: Jan. 28, 2004

(86) PCT No.: PCT/CA2004/000111

§ 371 (c)(1),
(2), (4) Date: Jul. 29, 2005

(87) PCT Pub. No.: WO2004/068021

PCT Pub. Date: Aug. 12, 2004

(65) Prior Publication Data
US 2006/0255227 A1    Nov. 16, 2006

(30) Foreign Application Priority Data
Jan. 29, 2003   (CA) ................................... 2415311

(51) Int. Cl.
A47B 91/00  (2006.01)
(52) U.S. Cl. ............................ 248/346.11; 248/346.06
(58) Field of Classification Search ................ 220/4.26; 248/188.1, 188.2, 188.9, 346.06, 346.11
See application file for complete search history.

(56) References Cited

U.S. PATENT DOCUMENTS

| | | | | | |
|---|---|---|---|---|---|
| 1,006,974 | A | * | 10/1911 | Moore et al. ................. | 254/104 |
| 1,655,611 | A | * | 1/1928 | Jensen ..................... | 248/188.5 |
| 1,879,030 | A | * | 9/1932 | Bayles ........................ | 52/112 |
| 2,893,164 | A | * | 7/1959 | Manatt ..................... | 248/188.2 |
| 3,017,152 | A | | 1/1962 | Alpaugh | |
| 3,018,992 | A | * | 1/1962 | Lore ........................ | 248/180.1 |
| 3,021,638 | A | * | 2/1962 | Kristek ..................... | 248/188.2 |

(Continued)

FOREIGN PATENT DOCUMENTS

DE       3306056       9/1984

(Continued)

*Primary Examiner*—J. Allen Shriver, II
*Assistant Examiner*—Bradley H Duckworth
(74) *Attorney, Agent, or Firm*—Nexus Law Group LLP; C. Larry Kyle

(57) ABSTRACT

A leveling assembly (2) comprising at least two leveling elements (4, 6) and having an uppermost surface (10) for seating a free-standing object 18. Elements (4, 6) are generally wedge-shaped, have upper (10, 14) and lower (12, 16) surfaces angled to one another (38, 42), are adapted to be placed one on the other and rotated relative to one another in order to vary the angle between the uppermost and lowermost assembly (16) surfaces. The elements (4, 6) may have co-operating guiding means (78, 82) or co-operating connecting means (184, 187) to aid in rotating the elements (4, 6) relative to one another and to resist shifting. In addition, the surfaces (16, 56) of the elements (4, 52) may be adapted with concave or cavity portions (58) in order to allow better seating on a surface (8). Reference markings (22, 28) placed on the elements (4, 6) aid in determining a suitable rotation of the elements (4, 6) relative to one another in order to compensate for a given slope.

5 Claims, 15 Drawing Sheets

U.S. PATENT DOCUMENTS

| | | | | |
|---|---|---|---|---|
| 3,030,730 A | * | 4/1962 | Costar | 248/188.2 |
| 3,198,472 A | * | 8/1965 | Marchand | 248/346.06 |
| 3,312,436 A | | 4/1967 | Beghetto, Jr. | |
| 3,524,614 A | * | 8/1970 | Sorth | 248/131 |
| 3,954,244 A | * | 5/1976 | Gopstein | 248/349.1 |
| 4,073,454 A | * | 2/1978 | Sauber | 248/188.2 |
| 4,575,039 A | * | 3/1986 | Persson et al. | 248/550 |
| 4,776,548 A | | 10/1988 | Bezenek | |
| 4,830,320 A | * | 5/1989 | Bellows | 248/188.2 |
| 4,891,905 A | | 1/1990 | Stolz | |
| 4,925,137 A | | 5/1990 | Hastings | |
| 4,962,906 A | | 10/1990 | Fatool et al. | |
| 5,074,514 A | | 12/1991 | Smith | |
| 5,078,350 A | | 1/1992 | Zorichak | |
| 5,205,097 A | * | 4/1993 | Harvey | 52/294 |
| 5,249,767 A | * | 10/1993 | Mellen | 248/188.2 |
| 5,438,957 A | | 8/1995 | Shagoury | |
| 5,570,864 A | | 11/1996 | Flores | |
| 5,823,488 A | * | 10/1998 | Nettekoven | 248/118 |
| 6,012,185 A | * | 1/2000 | Woods et al. | 5/509.1 |
| 6,401,866 B1 | | 6/2002 | Roy | |
| 6,484,437 B2 | * | 11/2002 | Roberts | 43/109 |

FOREIGN PATENT DOCUMENTS

| | | |
|---|---|---|
| DE | 29521459 | 4/1997 |
| FR | 2774515 A1 | 8/1999 |
| JP | 09191991 | 7/1997 |
| JP | 2001187997 | 7/2001 |

* cited by examiner

ADJUSTABLE LEVELING PEDESTAL FOR A FREE-STANDING OBJECT

FIELD OF THE INVENTION

The present invention relates to devices for supporting free-standing receptacles and other objects, and more particularly to a pedestal assembly for leveling a free-standing object in relation to the underlying surface.

BACKGROUND OF THE INVENTION

Free-standing objects placed on slopes typically stand at an angle that is slightly but noticeably off vertical. This is the case for example with plant pots placed on a garden area, sidewalk or driveway or refuse receptacles or newspaper vending machines placed on sloping roadsides. Even outdoor areas such as parking lots or shopping plazas may be perceived as level but in fact are typically sloped for drainage, with the result that any object such as a plant pot or refuse receptacle placed in such an area is likely to be seated slightly off-vertical. Many ad hoc methods have been developed for improving the leveling of such free-standing objects, typically involving placing one or more shims under the object, but the result is generally less than satisfactory. This is partly because the deviation from vertical is often in more than one direction at the same time and it is difficult to make accurate and simultaneous adjustments at the base of the object so that a true vertical of the free-standing receptacle or other object is achieved despite the underlying slope.

Devices for providing a level surface for supporting objects on a slope have been developed, as disclosed in U.S. Pat. No. 3,017,152 to Alpaugh; U.S. Pat. No. 3,043,049 to Gleason; U.S. Pat. No. 3,312,436 to Beghetto; U.S. Pat. No. 3,954,244 to Gopstein; U.S. Pat. No. 4,891,905 to Stolz; U.S. Pat. No. 4,925,137 to Hastings; U.S. Pat. No. 4,962,906 to Fatool et al.; U.S. Pat. No. 5,074,514 to Smith; U.S. Pat. No. 5,078,350 to Zorichak; U.S. Pat. No. 5,438,957 to Shagoury; U.S. Pat. No. 5,570,864 to Flores; and U.S. Pat. No. 6,401,866 to Roy. Such prior art has certain limitations and disadvantages when applied to the problem of providing a level support surface for a free-standing object on a slope. Such disadvantages include: having one or more extensible support legs or other supporting elements that protrude beyond the object supported; having mechanical parts that could jam or corrode if the product were used in an outdoor environment; being relatively complex to adjust for varying slopes; or utilizing an approach that may not be aesthetically pleasing.

Related art can also be found in objects developed to support or adjust furniture legs, pieces of furniture or larger objects having more than one locus of support, examples being U.S. Pat. No. 1,006,974 to Moore & McMahon, U.S. Pat. No. 3,018,992 to Lore, U.S. Pat. No. 3,021,638 to Kristek, U.S. Pat. No. 3,030,730 to Costar, U.S. Pat. No. 4,776,548 to Melles and U.S. Pat. No. 5,249,767 to Bezenek. In the approaches described in this prior art, the supporting components are attached to each other or to the object supported, requiring disengagement for adjusting, and/or involve a supported object which has attachments or supports at points additional to the support provided at the base of the supported object. As noted above, frequently metal components or mechanical parts are essential to the above inventions, which limits their utility in an outdoor environment, where factors leading to jamming, rusting and corrosion are likely to be involved.

Accordingly, it is an object of an embodiment of this invention to provide an easily adjustable leveling pedestal assembly for leveling a free-standing object in relation to an underlying surface.

Other objects of the invention will be apparent from the description that follows.

SUMMARY OF THE INVENTION

The leveling pedestal according to the invention provides a mobile, free-standing, level seat for a free-standing receptacle—such as a plant pot, refuse receptacle, newspaper box, mail-box, or bird-bath—and also for other free-standing objects having a single locus of support. While its preferred use is in providing a level surface in relation to a sloped underlying surface, the leveling pedestal also permits seating the free-standing receptacle or like object at a desired and easily alterable angle in relation to an underlying horizontal surface to provide a useful tilt or preferred non-vertical positioning of the free-standing object.

According to the invention, the assembly comprises at least two leveling elements and provides an uppermost surface that acts as a seat for a free-standing object. The leveling elements are generally wedge-shaped and have upper and lower surfaces at an angle to one another. The elements are adapted to be placed one on the other and can be rotated relative to one another in order to vary the angle between the uppermost and lowermost surfaces of the assembly. The elements may have co-operating guiding means to aid in centering and rotating the elements relative to one another and to resist shifting. In addition, the surfaces of the elements may be adapted with a cavity, for example in the form of a concave portion or a central opening in order to allow better seating on a surface.

In one aspect, the invention comprises an adjustable leveling assembly for supporting and leveling a free-standing object. The assembly comprises a first leveling element having an upper surface and a lower surface and a second leveling element having a top surface and a bottom surface. The upper surface lies substantially in a first plane and is adapted to support the free-standing object. The lower surface lies substantially in a second plane and is adapted to be in contact with the top surface, which in turn lies substantially in a third plane and is adapted to be in contact with the lower surface and to support the first leveling element. The first leveling element is adapted to be seated on the second leveling element and to be rotated in relation to it. The bottom surface lies substantially in a fourth plane and is adapted to be placed in contact with a further surface. The first and second planes intersect at a first intersection angle, and the third and fourth planes intersect at a second intersection angle. Rotation of the first and second leveling elements in relation to one another varies the relative angle between the first and the fourth planes. The first intersection angle may be equal to or different than the second intersection angle.

Further aspects of the invention include the following:

a. the first leveling element being freely seated on the second leveling element such that the lower surface is in contact with the top surface and the second plane and the third plane are parallel;

b. when the lower surface is in contact with the top surface, the leveling elements may be positioned relative to each other such that the first plane is parallel to the fourth plane;

c. each of the first and second leveling elements further comprise co-operating guiding members. The guiding members may take the form of a circular lip projecting from a surface of one of the elements and a circular channel recessed in a surface of the other one of the elements. The circular lip is adapted to fit within the circular channel;

d. the guiding members may comprise a substantially circular lip projecting from the lower surface and an outer perimeter of the top surface. The circular lip has radially inner and outer surfaces. In addition, the top surface is substantially circular and the radially inner surface has a radius that is larger than the radius of the top surface. The circular lip may also comprise a lower edge that is parallel to the upper surface. The lower surface is angled and recessed relative to the circular lip;

e. the leveling assembly further comprises a perimeter wall depending from the upper surface; and f. wherein at least one of the leveling elements has a cavity. The cavity may be centrally located in and pass through the element.

In yet another aspect, the invention comprises an adjustable leveling assembly for leveling a free-standing object on a slope comprising a top and a bottom element, the elements being generally wedge shaped in longitudinal section and being rotatable in relation to one another. The assembly has an uppermost surface lying in a first plane and a lowermost surface lying in a second plane, rotation of at least one of the elements relative to the other varying a relative intersection angle between the first and the second plane. The uppermost surface provides a seat for the free-standing object and the lowermost surface is placed in contact with the slope. The free-standing object may be a receptacle.

The foregoing was intended as a broad summary only and of only some of the aspects of the invention. It was not intended to define the limits or requirements of the invention. Other aspects of the invention will be appreciated by reference to the detailed description of the preferred embodiment and to the claims.

BRIEF DESCRIPTION OF THE DRAWINGS

These and other features of the invention will become more apparent from the following description in which reference is made to the appended drawings and wherein.

DETAILED DESCRIPTION OF THE PREFERRED EMBODIMENTS

Figure 1:
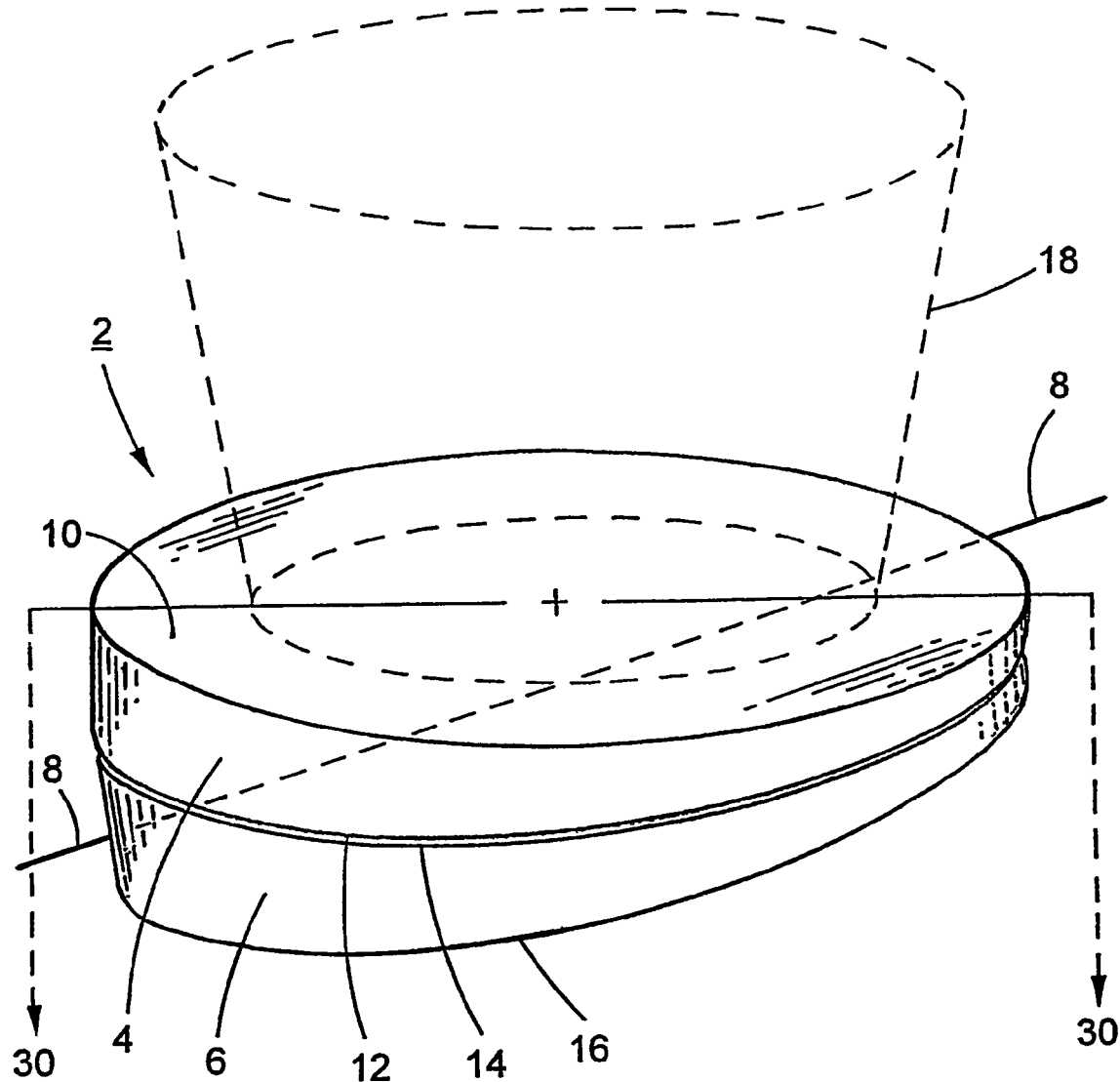
FIG. 1 is a perspective view of a preferred embodiment of a leveling assembly, the leveling assembly shown seated on a sloped surface and showing a free standing receptacle in stippled lines.
Figure 2:
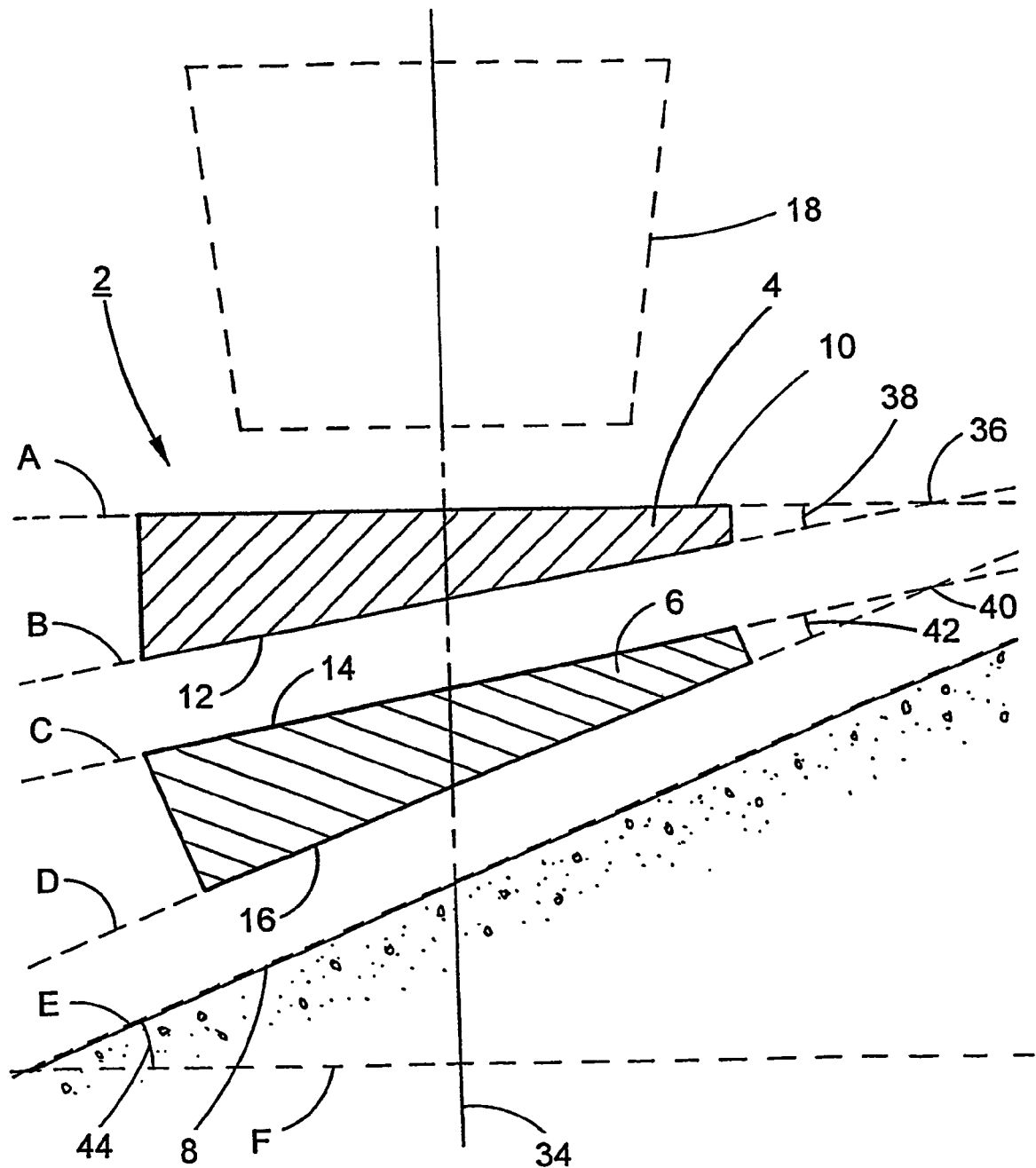
FIG. 2 is an exploded cross sectional view along line 30-30 of FIG. 1 showing the leveling assembly, sloped surface and free standing receptacle of FIG. 1.

The preferred embodiment of a leveling assembly (sometimes referred to herein as a leveling pedestal, a pedestal assembly, or a leveling pedestal assembly) 2 according to the invention is shown in FIGS. 1 and 2.

Pedestal assembly 2 is shown seated on sloped surface 8. Pedestal assembly 2 comprises a first leveling element 4 and a second leveling element 6. Preferably the leveling elements are substantially cylindrical and of substantially identical dimensions, however, it is contemplated that other shapes could be used as will be discussed further below. When the elements are substantially identical, their relative positions in the assembly on top or below one another may be interchanged without affecting the use of the assembly.

The leveling elements 4, 6 are generally wedge-shaped when viewed in cross section, as illustrated in FIG. 2. First leveling element 4 has an upper surface 10 and a lower surface 12. Second leveling element 6 has a top surface 14 and a bottom surface 16. Bottom surface 16 is adapted to be seated on, and be in contact with, underlying surface 8. Preferably upper, lower, top and bottom surfaces 10, 12, 14 and 16 are flat, however, it is contemplated that other shapes may be used, provided that the surfaces continue to be adapted for seating against one another, against an underlying surface 8 or against the base of a free standing object such as receptacle 18, as the case may be.

In the drawings, for consistency and comparison, the leveling elements have been shown arranged such that the cross sectional view is perpendicular to the planes in which the surfaces lie. In this way, the slope of each element is clearly illustrated.

Referring to FIG. 2, first leveling element 4 and second leveling element 6 together with free-standing receptacle 18 are each centered on vertical center line 34 which is at 90 degrees to horizontal plane F. Upper surface 10 of leveling element 4 lies substantially in a plane A and lower surface 12 lies substantially in a plane B. Planes A and B intersect at an intersection point 36 at a first intersection angle 38.

Top surface 14 of leveling element 6 lies substantially in a plane C and bottom surface 16 lies substantially in a plane D, planes C and D intersecting at an intersection point 40 and at a second intersection angle 42.

The underlying surface 8 is a sloped surface at an angle to the horizontal. Surface 8 lies in plane E, which intersects with horizontal plane F, at a slope angle 44.

In the preferred embodiment, lower surface 12 and top surface 14 are elliptic while upper surface 10 and bottom surface 16 are circular. Preferably, the first and second intersection angles 38, 42 are equal, however this need not be the case.

In use, one leveling element is placed atop the other. This is illustrated in FIG. 1, where first leveling element 4 is placed atop second leveling element 6. By rotating the elements 4, 6 in relation to each other about vertical center line 34 (FIG. 2), the relative angle of intersection between planes A and D may be varied. This angle will vary between a maximum defined by the sum of the first and second intersection angles 38, 42 to a minimum defined by the greater of the first and second intersection angles 38, 42 minus the lesser of the two.

Preferably leveling elements will be produced with intersection angles ranging from 0.5 degrees to 25 degrees. Using the formula discussed above, leveling assemblies according to the invention can compensate for slopes of up to 50 degrees. For example, if both the first and second leveling elements have intersection angles of 25 degrees, the intersection angle between planes A and D can be varied from a maximum angle of 50 degrees to a minimum of 0 degrees. If the first and second leveling elements have intersection angles of 15 and 20 degrees respectively, the intersection angle between planes A and D could be varied from a maximum of 35 degrees to a minimum of 5 degrees. The invention thus permits the placement of receptacles or other free-standing objects in locations that would, without the invention, likely be considered too steep to accommodate an object such as a plant pot or refuse receptacle. In the event that a given underlying slope is steeper than the combined maximum angle provided by two leveling elements, a third or more leveling elements can be added to increase the total angle for which the leveling assembly can compensate.

If a user desires to provide a horizontal surface upon which to place an object such as a receptacle, for example a vase or planter, the elements should be rotated relative to each other until the angle between planes A and D is equal to slope angle 44. Once the desired angle has been achieved, the leveling assembly 2 need simply be placed on surface 8 oriented such that the angle between planes A and D and the slope angle cancel each other out. In other words, pedestal 2 is seated on surface 8 so that plane A is parallel to plane F. Alternatively, the leveling assembly 2 can be used to tilt an object seated on its upper surface 10 at a desired angle to the horizontal, should a user desire this effect.

Alternative embodiments are illustrated in FIGS. 3 through 15. Aspects of the alternative embodiments identical to those of the preferred embodiment have identical reference numbers.

Figure 3:
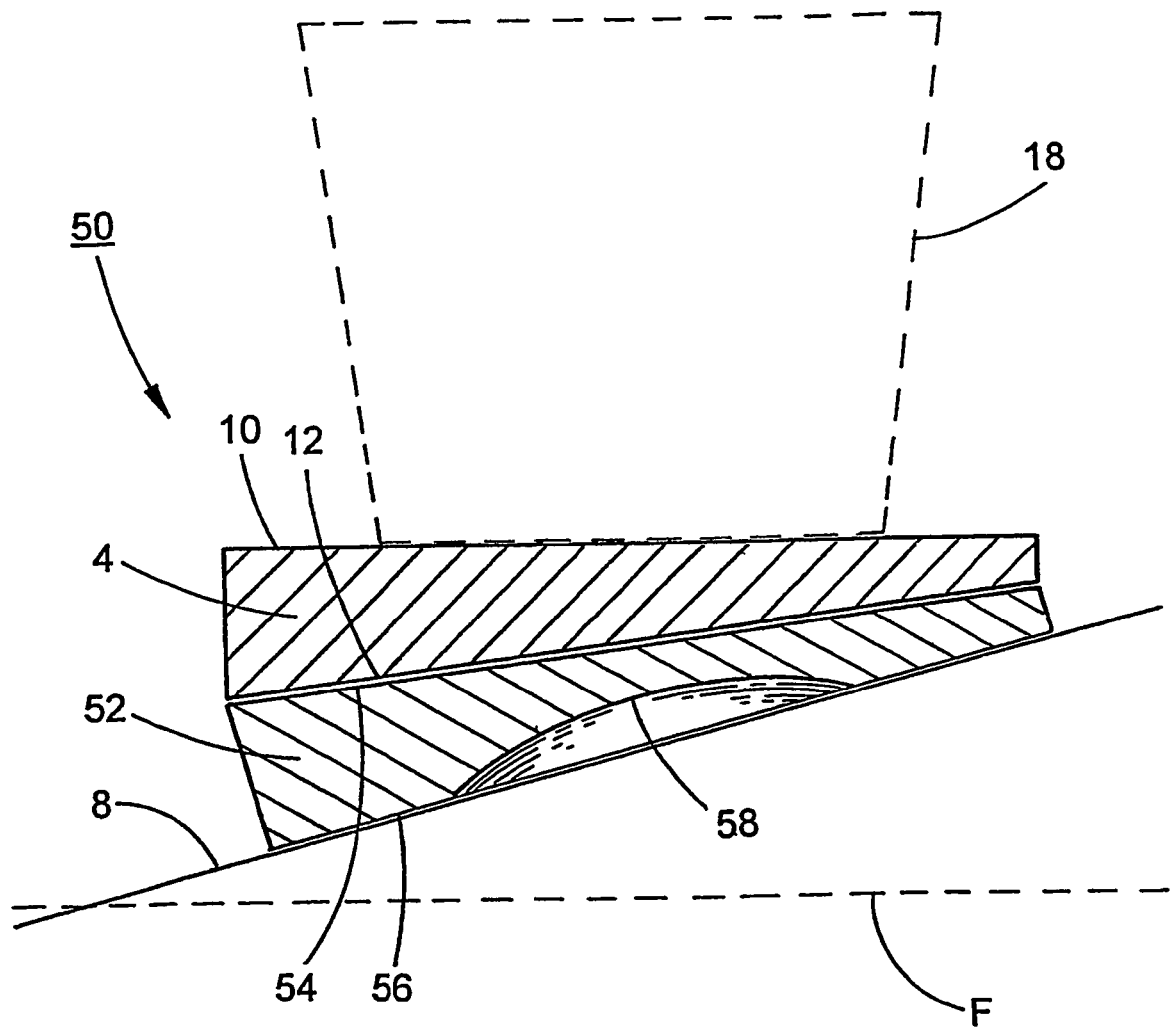
FIG. 3 is a cross sectional view of an alternative embodiment of a leveling assembly showing a lower leveling element modified by a concavity.
Figure 4:
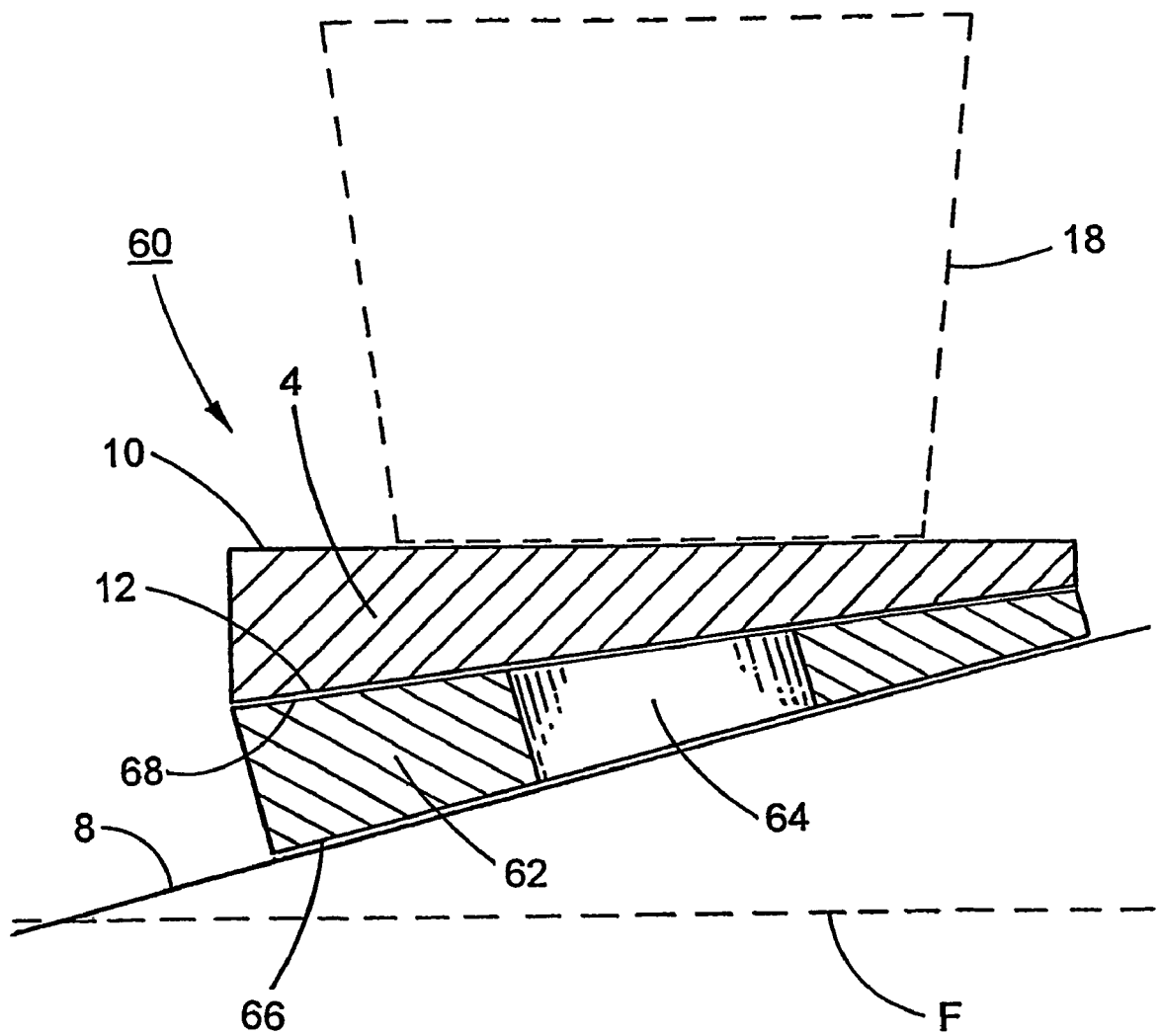
FIG. 4 is a cross sectional view of a second alternative embodiment of a leveling assembly showing a lower leveling element having a central opening.

As noted above, the surfaces of the leveling elements need not be perfectly flat, nor do they have to be continuous. The surfaces upon which the pedestal may be placed will not always be perfectly planar, but rather may only lie substantially in a given plane. For example, if surface 8 were the ground, there may be bumps and other irregularities. Minimizing the surface area of the surface of the leveling element coming into contact with surface 8 may be beneficial in such circumstances and may be accomplished in a number of ways, two of which are illustrated in FIGS. 3 and 4. This is also beneficial from a cost standpoint as material requirements and the weight of the element are reduced.

In FIG. 3, an alternative design for a leveling pedestal 50 has a second leveling element 52. First leveling element 4 is adapted to be seated on top surface 54 of second leveling element 52. Second leveling element 52 has a bottom surface 56 lying in contact with surface 8 and a cavity in the form of a central concave portion 58 lying away from surface 8. The cavity could also take other shapes, for example, it could be cylindrical, square or irregular, provided solely that it lie away from surface 8.

Central concavity 58 enhances the stability of the seating of leveling pedestal 50 in the event that surface 8 is rough or uneven. Nonetheless, the bottom surface 56 lies substantially in a given plane. In FIG. 3, the leveling elements 4, 52 are shown oriented (by rotation) relative to one another and relative to surface 8 such that upper surface 10 is parallel to horizontal plane F thereby providing a level seat for free-standing receptacle 18.

In FIG. 4, leveling pedestal assembly 60 comprises a first leveling element 4 and a second leveling element 62. Assembly 60 is positioned on surface 8 so as to provide a level upper surface for the seating of free-standing receptacle 18. Lower surface 12 of leveling element 4 and top surface 68 of leveling element 62 are centered and in contact. Second leveling element 62 has a cavity in the form of a central opening 64 extending from bottom surface 66 to top surface 68. Preferably, central opening 64 is cylindrical, however any shape would be satisfactory and the size of the central opening may be varied. The principal limitation with respect to the shape and size of the central opening is that top surface 68 and bottom surface 66 remain capable of coming into suitable contact with other surfaces. Central opening 64 enhances the stability of seating of leveling pedestal 60 in the event that surface 8 is rough or uneven. Central opening 64 also provides additional benefits to leveling element 62, such as allowing drainage, making it easier to grip, reducing its mass so it is lighter to carry, and reducing material requirements for manufacturing.

In order to assist a user in maintaining the alignment of the leveling elements of a leveling assembly when rotating them relative to one another, the elements may be provided with co-operating guiding members. The guiding members may take a variety of shapes and styles as illustrated in, but not limited to, the alternative embodiments shown in FIGS. 5 through 7 and as discussed in more detail below. However, in each case, the guiding members should be circular, even if they are provided on a non-circular (for example an elliptic) surface. This allows rotation of one leveling element on the other while the respective guiding members are in contact with one another.

Figure 5:
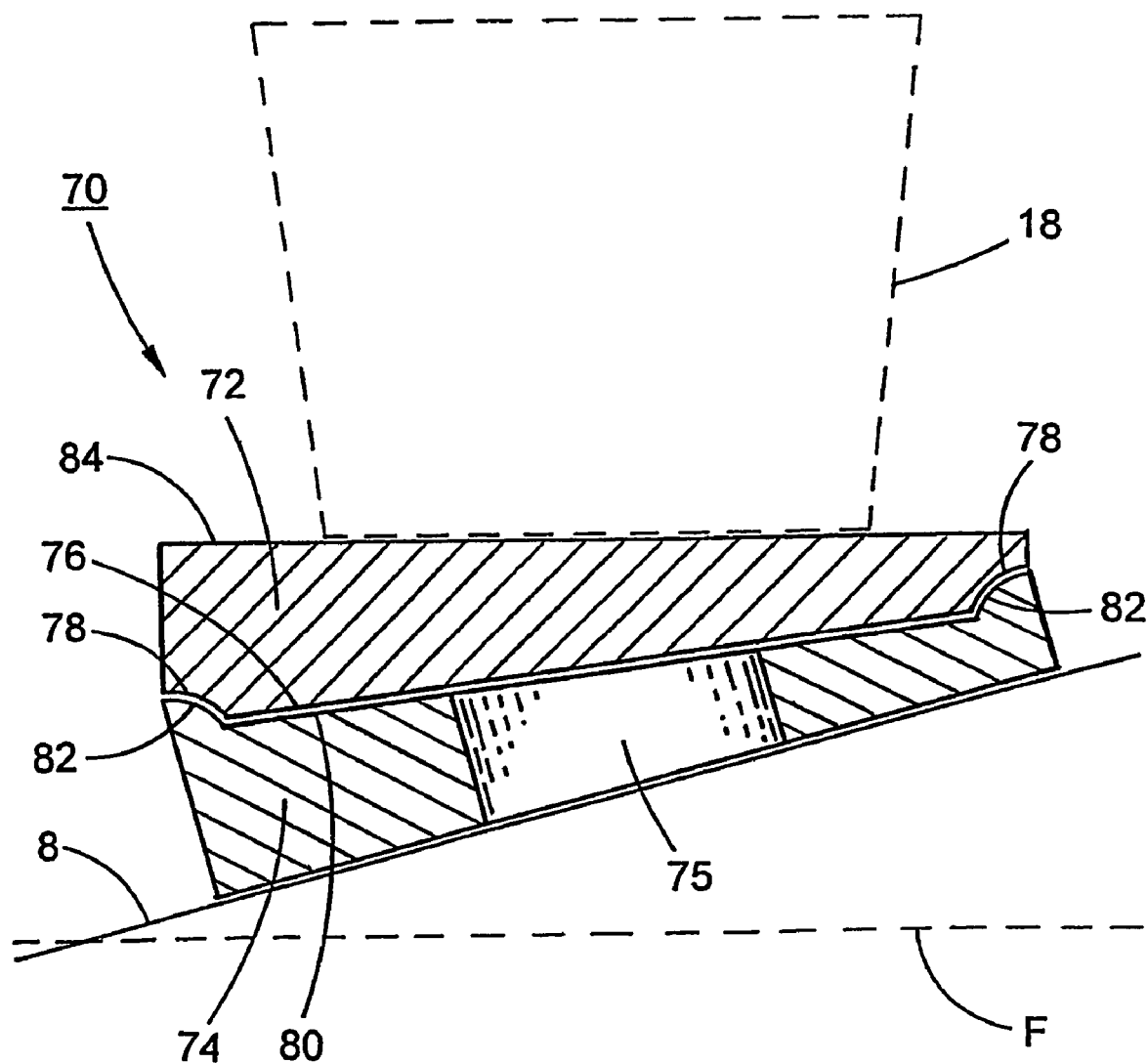
FIG. 5 is a cross sectional view of a third alternative embodiment of a leveling assembly.

In FIG. 5, leveling pedestal assembly 70 comprises first leveling element 72 and second leveling element 74 having co-operating perimeter guiding members 78, 82 respectively. Leveling element 74 is also shown with a central cavity 75. Guiding member 78 is a recessed circular channel travelling about the perimeter of lower surface 76 of the first leveling element 72. Circular lip 82 extending out of top surface 80 is dimensioned so as to loosely fit within recessed circular channel 78. The respective guiding members 78, 82 enhance ease and certainty when centering leveling element 72 on leveling element 74, as well as enhancing the stability of the leveling pedestal 70 when the leveling elements 72, 74 have been rotated into a chosen position. With such guiding members, the angle of each element may be increased as guiding members provide an added resistance to prevent the upper element 72 from sliding off the lower element 74. Receptacle 18 is shown seated on upper surface 84 which, in the leveling pedestal shown in FIG. 5, is parallel to horizontal plane F.

Figure 6:
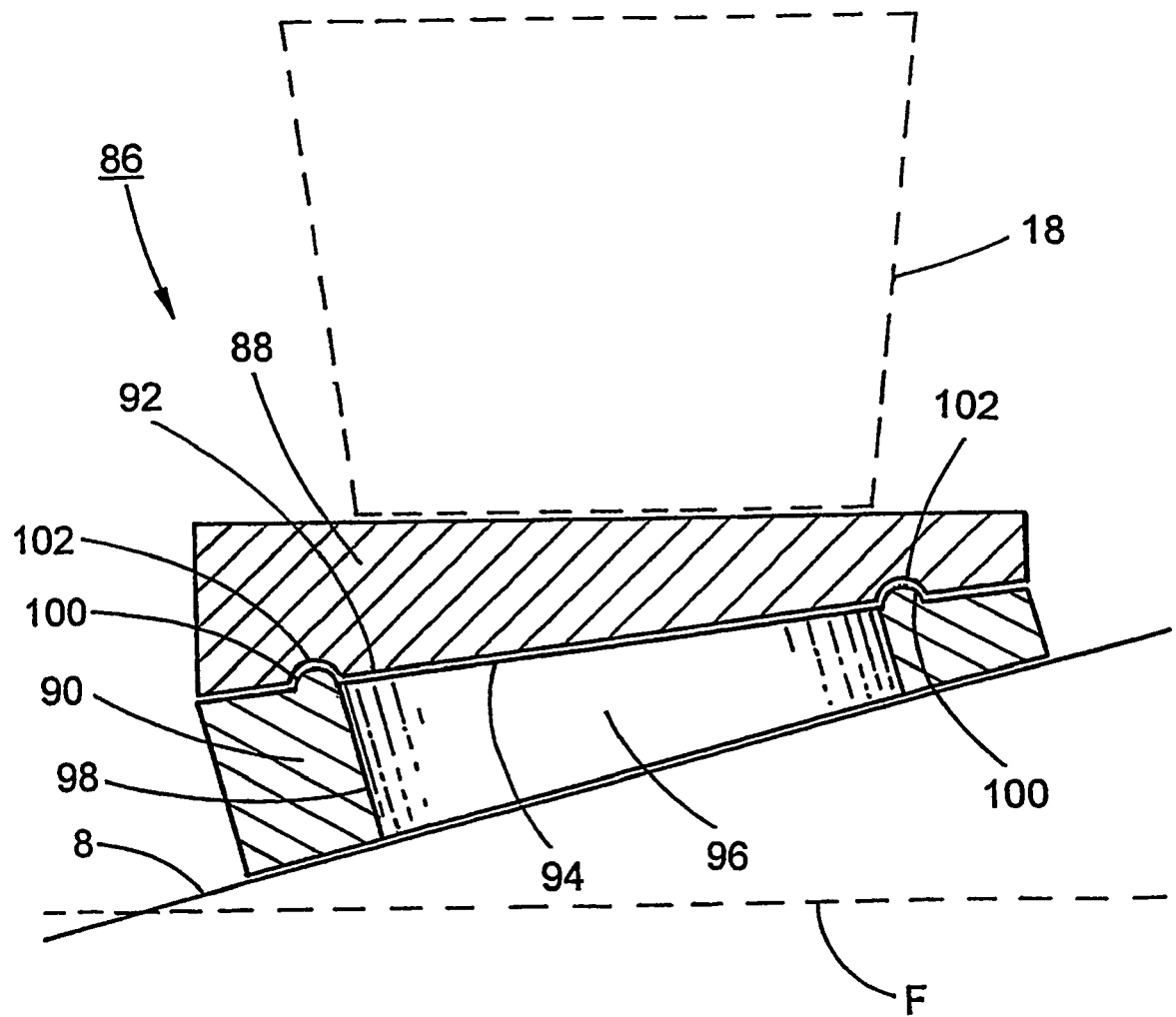
FIG. 6 is a cross sectional view of a fourth alternative embodiment of a leveling assembly.

A further example of a guiding member is illustrated in FIG. 6. Leveling assembly 86 has a first leveling element 88 and a second leveling element 90, leveling element 88 being centered on leveling element 90 and lower surface 92 being in contact with top surface 94. Leveling element 90 has a central opening 96 defined by inner wall 98. Guiding member 100 is a circular lip depending from and extending away from top surface 94. Guiding member 102 is a recessed circular channel positioned radially inward from the perimeter of lower surface 92. Preferably, the co-operating guiding members 100, 102 are dimensioned so that circular lip 100 fits loosely within channel 102. To that end, it is preferred that the channel and the lip extend into or out of their respective surfaces at ninety degrees to that surface. In that way the guiding members will mesh appropriately throughout rotation of the two elements relative to one another.

Figure 7:
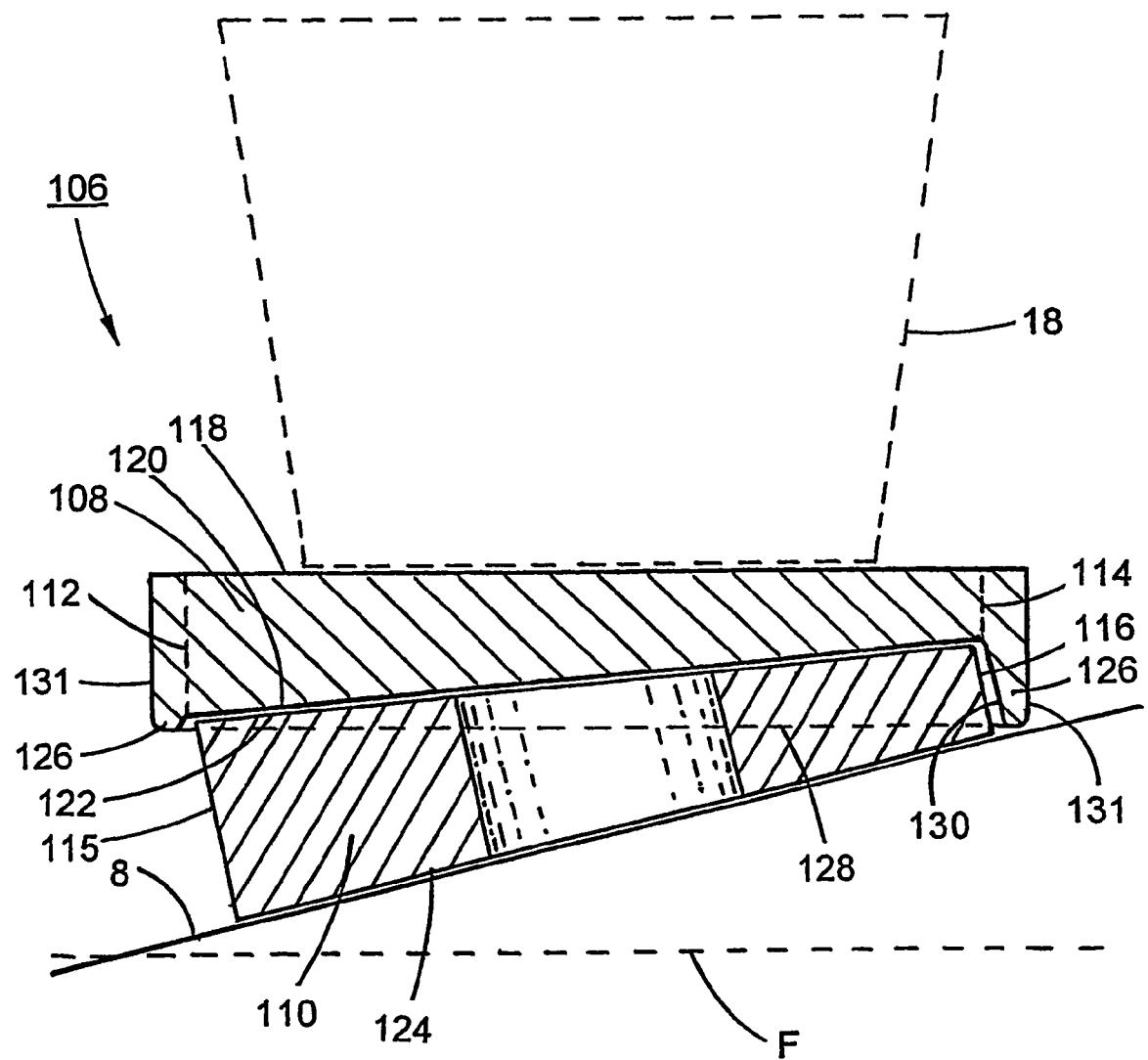
FIG. 7 is a cross sectional view of a fifth alternative embodiment of a leveling assembly.

Yet another example of a guiding member on a further alternative embodiment is illustrated in FIG. 7. Pedestal assembly 106 has a first leveling element 108 that is centered and seated on a second leveling element 110; lower surface 120 being in contact with top surface 122 and bottom surface 124 in contact with surface 8. First leveling element 108 has a guiding member comprising a circular lip 126 having a radially inner surface 130, a radially outer surface 131 and a lower edge 128. Second leveling element 110 has a guiding member comprising an outer perimeter of top surface 122. Radially inner surface 130 has a radius that is larger than a radius of the top surface 122. Lower edge 128 is parallel to upper surface 118 and therefore angled in relation to the lower surface 120. The thicknesses of first element 108 as represented by reference numerals 112 and 114 are less than the thicknesses of second element 110 as represented by reference numerals 115 and 116. The increased thickness of second element 110 is required to accommodate the increased clearance required by the circular lip 126. Circular lip 126 is shaped so as to allow rotation of the first and second elements 108, 110 about each other. This downwardly extending circular lip 126 provides centering and stabilization of the leveling elements in relation to each other. In addition, because lower edge 128 is parallel to upper surface 118, the overall level appearance of the pedestal is enhanced. It will be appreciated that in this embodiment, first leveling element 108 is constrained to be used seated on top of leveling element 110 if surface 120 faces the underlying surface 8. However, the entire assembly may be inverted for use in supporting the receptacle on surface 124.

Figure 8:
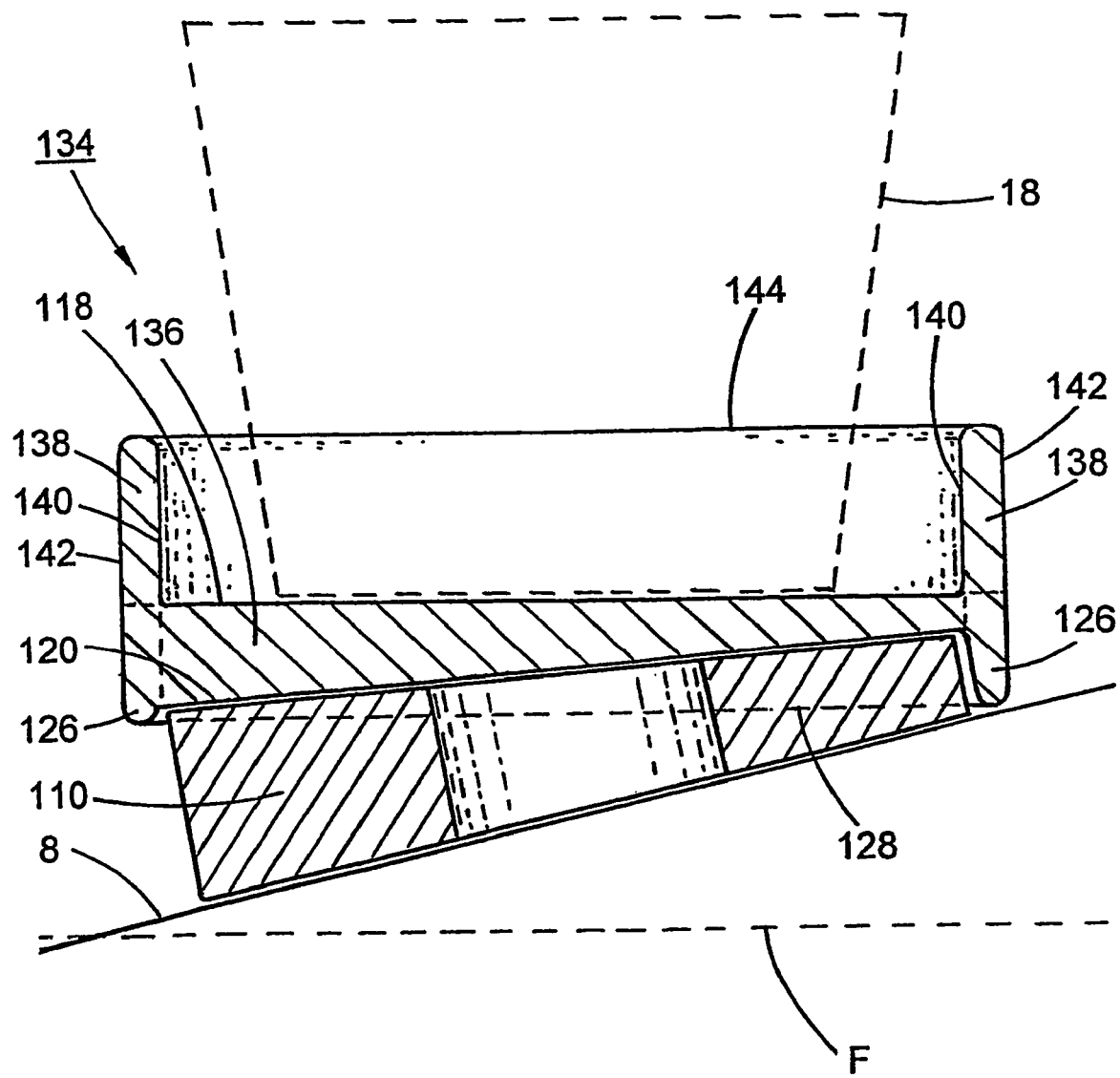
FIG. 8 is a cross sectional view of a sixth alternative embodiment of a leveling assembly.

The embodiment shown in FIG. 8 is a further variation of the embodiment in FIG. 7. Leveling assembly 134 has a second leveling element 110 identical to that of pedestal 106. First leveling element 136 has an upper surface 118, a lower surface 120 and circular rim 126 which are also identical to those aspects of leveling element 108 discussed above. However, element 136 also has an upwardly extending, preferably circular, perimeter wall 138 depending from, and substantially perpendicular to, surface 118. Wall 138 has a radially inner side wall 140, a radially outer side wall 142 and an upper edge 144. For aesthetic purposes, the circular wall 138 may have a similar circumference to circular lip 126, however its size and shape may be varied as may the angle at which it extends from upper surface 118. Similarly, the distance that circular wall 138 extends from upper surface 118 may also be varied. A free-standing receptacle 18 seated on upper surface 118 will be bordered by perimeter wall 138. The circular wall 138 provides a saucer-like catchment edge for water and spillage as well as providing additional stability for the free-standing receptacle 18. Perimeter wall 138 forms an enclosure or receptacle within which other, non-freestanding objects may be placed, for example soil or liquids. In this way, for example, a plant pot may be made incorporating the leveling assembly of the invention.

Figure 9:
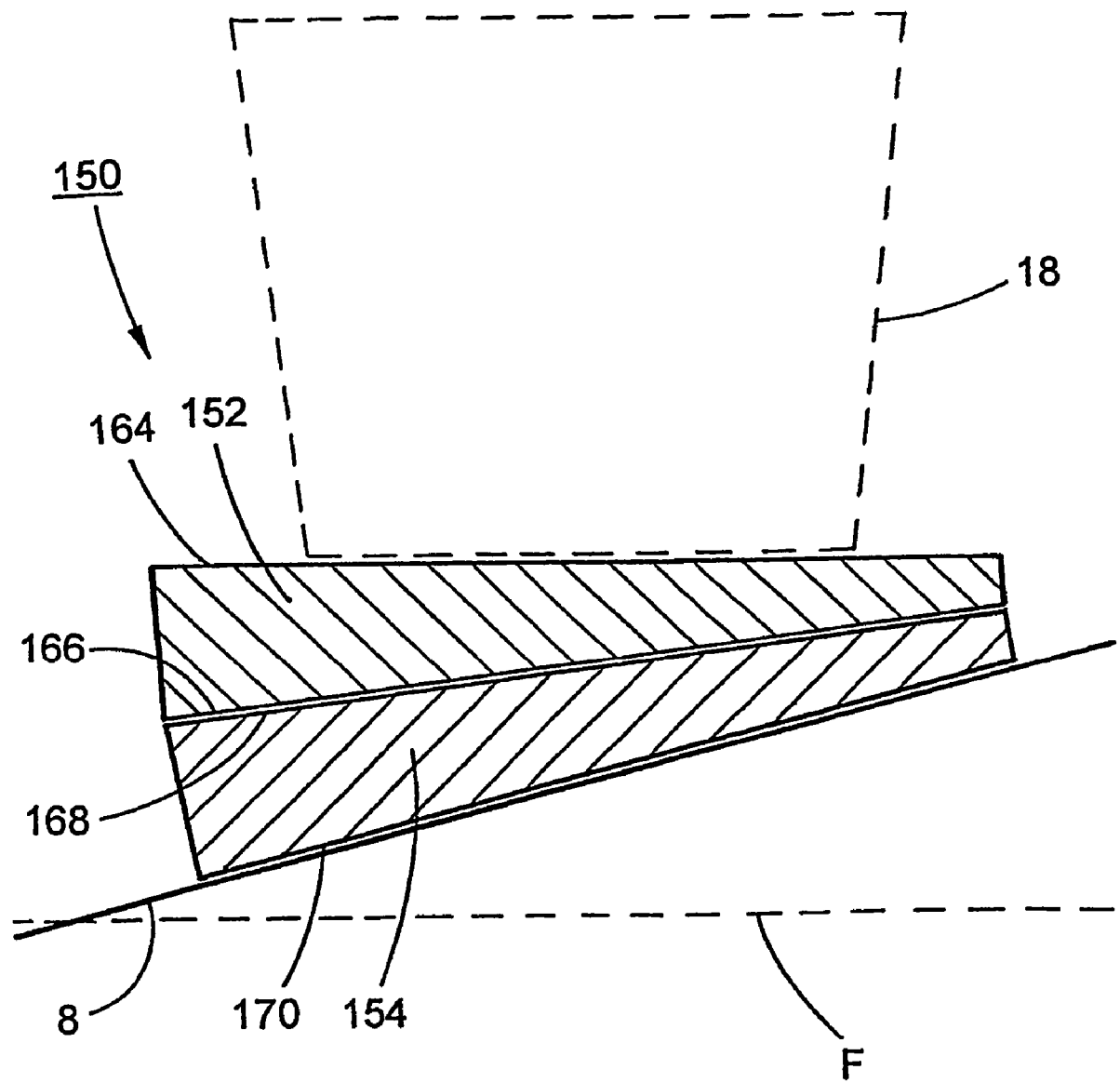
FIG. 9 is a cross sectional view of a seventh alternative embodiment of a leveling assembly.
Figure 10:
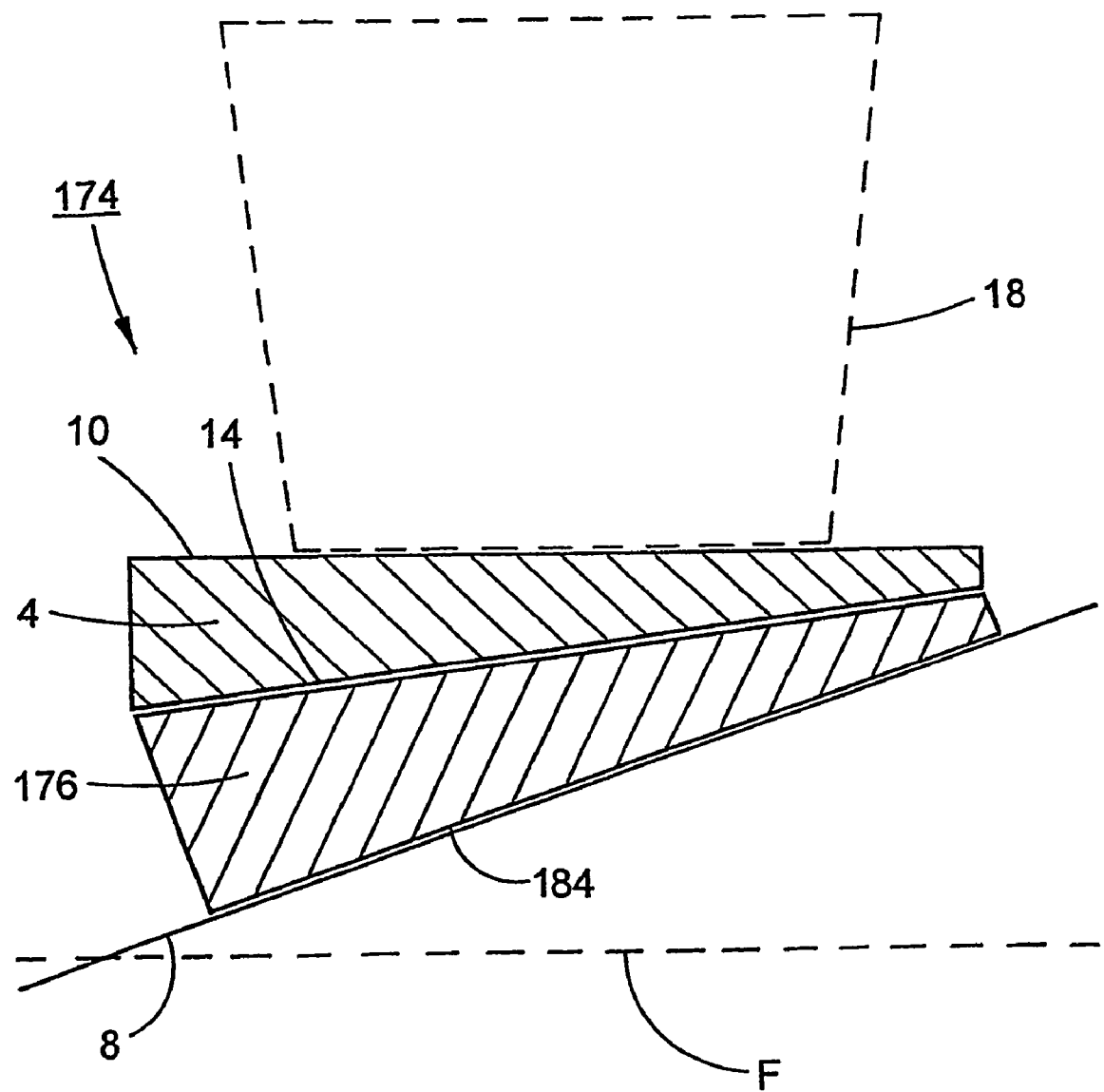
FIG. 10 is a cross sectional view of an eighth alternative embodiment of a leveling assembly.

In a further alternative embodiment shown in FIG. 9, leveling assembly 150 has first and second leveling elements 152, 154, wherein each of upper, lower, top and bottom surfaces 164, 166, 168, 170 is substantially circular and substantially equal in diameter. By having all surfaces circular and with identical dimensions, in particular lower surface 166 and top surface 168, there is no overlap when the leveling elements are rotated relative to one another. This allows for exact centering of the leveling elements one on the other and exact alignment of the perimeter surfaces of the elements. This exact alignment enhances tracking between the co-operating guiding means that may also be provided, as the elements are rotated relative to one another. Conversely, in leveling assembly 2, where lower surface 12 and top surface 14 were elliptic, as shown in FIG. 1, as the two leveling elements 4, 6 are rotated about each other there is a slight overlapping of lower surface 12 and top surface 14.

Figure 11:
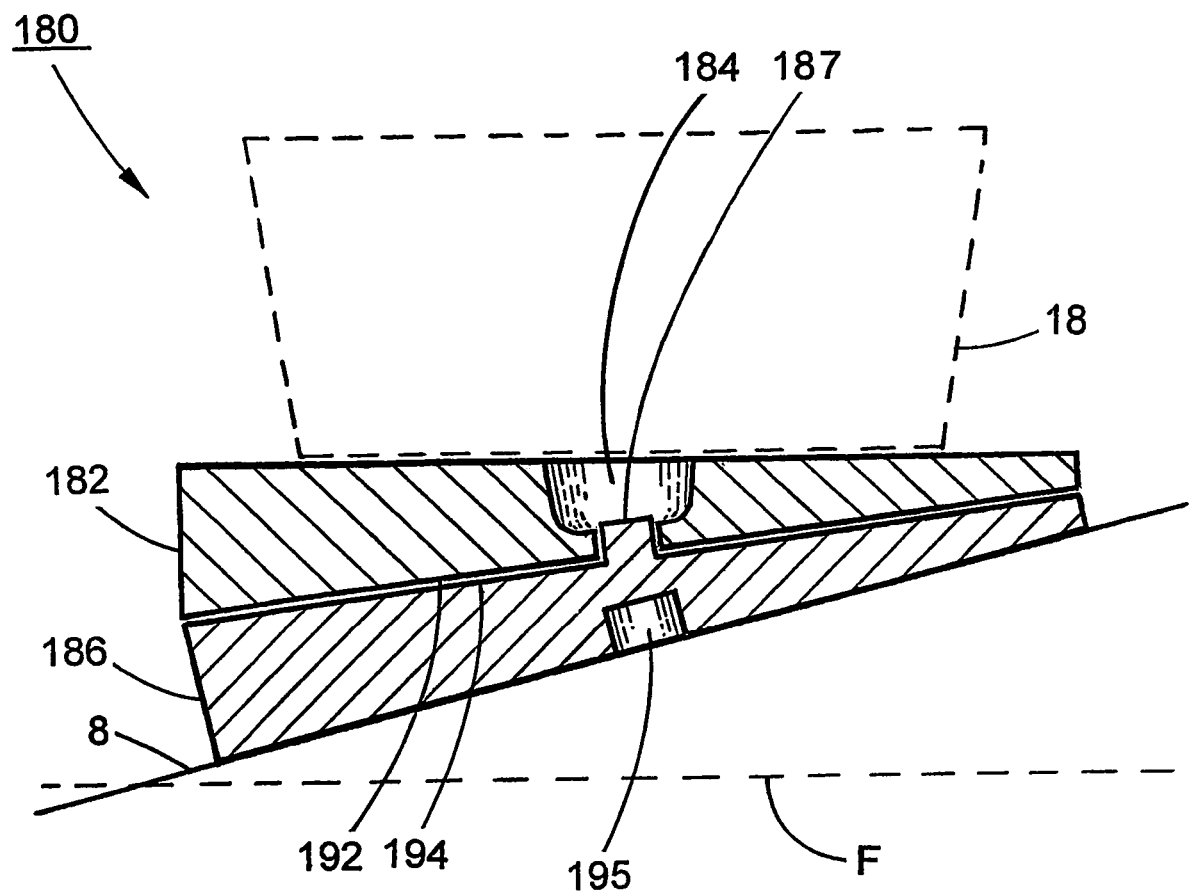
FIG. 11 is a cross sectional view of a ninth alternative embodiment of a leveling assembly.

A further example of guiding means is shown in FIG. 11. Freely seated leveling pedestal 180 is positioned on slope 8. A first leveling element 182 has a central cylindrical opening 184. Cylindrical opening 184 is formed in, and is perpendicular to, lower surface 192. A second leveling element 186 has central cylindrical projection 187. Cylindrical projection 187 projects from, and is perpendicular to, top surface 194. Central opening 184 and cylindrical projection 187 are sized such that cylindrical projection 187 may be loosely fitted into central opening 184 to center the elements on each other. Second leveling element 186 may also be equipped with a central receptive opening 195 adapted to receive the cylindrical projection of a further element (not shown).

The intersection angles of the respective leveling elements of a leveling assembly need not be the same. For example, In FIG. 10, leveling assembly 174 has a first leveling element 4 centered on and in contact with a second leveling element 176. The intersection angle of the planes of the first leveling element 4 is smaller than the intersection angle of the planes of second leveling element 176.

The leveling elements may be constructed of any type of formable, rigid material, such as plastic, clay, ceramic, cement, rubber or the like. Because the leveling elements are likely to be used primarily in an outdoor setting that is subject to weather, it is also preferred that the material be resistant to corrosion or rusting. The leveling assembly of the invention is not limited to outdoor use and may be enhanced by modification of the exterior surfaces of the leveling elements to resemble rock or brick, or by adding designs, attractive markings or sculptural effects.

Figure 12:
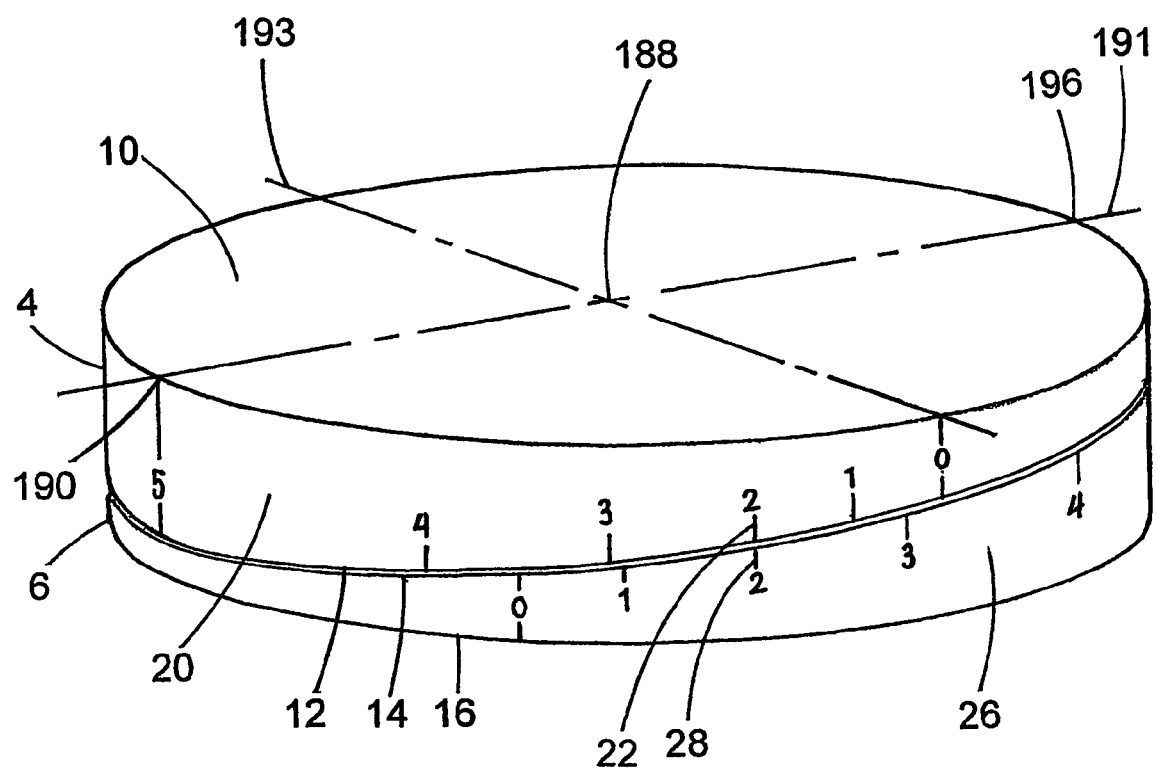
FIG. 12 is a perspective view of the leveling assembly of FIG. 1 with markings on the side of the upper and lower leveling elements.

Reference markings may be placed on the elements in order to provide reference points for easier determination of a suitable positioning of a pair of elements relative to one another in order to correspond to a given slope. These markings can be simple, such as a series of coloured markings or symbols providing visual reference points, or more complicated such as a series of numbers. These markings aid the user in determining and re-creating the preferred positioning of the leveling elements in relation to each other in order to achieve a given orientation of the uppermost surface. For example, the outer circumference of a leveling element can be numbered with a 0 and a 10, diametrically opposed indicating the direction in which the element is sloped and to indicate the sides of greatest and least thickness of the element. A set of numbers from 1 to 9 may be spaced about the perimeter on either side between the 0 and 10. Such marking may assist in determining the value of the slope of the underlying surface The preferred embodiment of a marking system is shown in FIG. 12. A first set of number markings 22 is marked along the cylindrical side surface 20 of first leveling element 4. A second set of number markings 28 is marked along the cylindrical side surface 26 of second leveling element 6. The sequence of numbers shown (0 through 5) is purely illustrative and could be replaced by any sequence; markings other than numbers could also be used. The number markings guide the user in adjustment of the leveling elements so that the upper surface 10 of the first element is horizontally level. The number markings guide the user by indicating key points of different height between the upper surface 10 and the lower surface 12 of the top element and between the top surface 14 and bottom surface 16 of the bottom element.

The positioning of the respective number markings will now be discussed in greater detail with reference to FIG. 12. The highest number of the number markings, in this case the number 5, is marked at the apogee 190 of the slope of the respective element. Descending numbers are then marked along the side, preferably terminating in a 0 at the mid point between the apogee and nadir (high and low ends) 190, 196 of the element. Preferably the radial distance between consecutive numbers decreases in the descending order of the numbers, such that the difference in the thickness of the element between adjacent numbers is the same. A meridian line 191 passing through the center of the element 188 and travelling in the direction of the slope of the element identifies the high and low ends 190, 196. Line 193 travelling through center 188 perpendicular to line 191 indicates the halfway point between the high and low ends of the element. An element could be marked with one or more sets of markings. Preferably the descending numbers on either half of the meridian line 191 are mirrored in the other leveling element's opposite side. Ideally, however, if more than one set of markings is present, it is preferred that the markings mirror one another on either side of the meridian line 191.

Alternatively, the number markings could also be placed at the low end of the elements (the lower half), however this is more difficult given the reduced thickness of the element in this area. If this setup were adopted, the numbering would commence at the low end with consecutive numbers on one element going in the clockwise direction and for the other element going in the counterclockwise direction.

In order for this marking system to work, two equally sized elements need have mirror image marking (the mirror being a meridian line traveling through the center of the element in the direction of slope—the descending numbers on one element are mirrored in the other leveling elements opposite side), as illustrated in FIG. 12 where number markings 22 on first leveling element 4 are the mirror image of number markings 28 on second leveling element 6. One element has numbering commencing at the high end of the slope decreasing in the counterclockwise direction and the other element has numbering decreasing from the high end in the clockwise direction. Of course, if each element already has mirror numbering on each side of the meridian line as discussed above and both elements are identical then each element also has mirror numbering of the other element.

When two elements having the same slope are marked as discussed above and placed one atop the other, the markings allow an easy determination of the direction and amount of slope of the resulting leveling assembly. For example, as shown in FIG. 12, elements 4 and 6 are rotated relative to one another such that the number 2s respectively marked on each element are aligned. The aligned numbers mark the apogee of the leveling assembly, with equal thickness to the left and to the right of a meridian passing through the apogee at right angles to said meridian. The slope of the assembly shown in FIG. 12 is in the direction of an axis travelling from the number 2 to the diametrically opposed side.

The user then aligns the slope of the leveling pedestal with the slope of the surface and places it on the surface. If the resulting leveling pedestal from two elements with their number 2s aligned provides too little slope, the user could then try aligning the number 4s (which then mark the apogee of the assembly) and aligning the resulting slope of the leveling pedestal with the slope of the surface. If the 4s provide too great a slope, then the user could align the number 3s. The user continues to align different number markings (or points therebetween) on a trial and error basis until the slope of the leveling pedestal is equal to that of the underlying surface. Having the number markings simplifies this process by providing reference points. The amount of the slope of the assembly decreases from a maximum when the number 5 on each element is aligned to no slope when the 0s are aligned.

Figure 14:
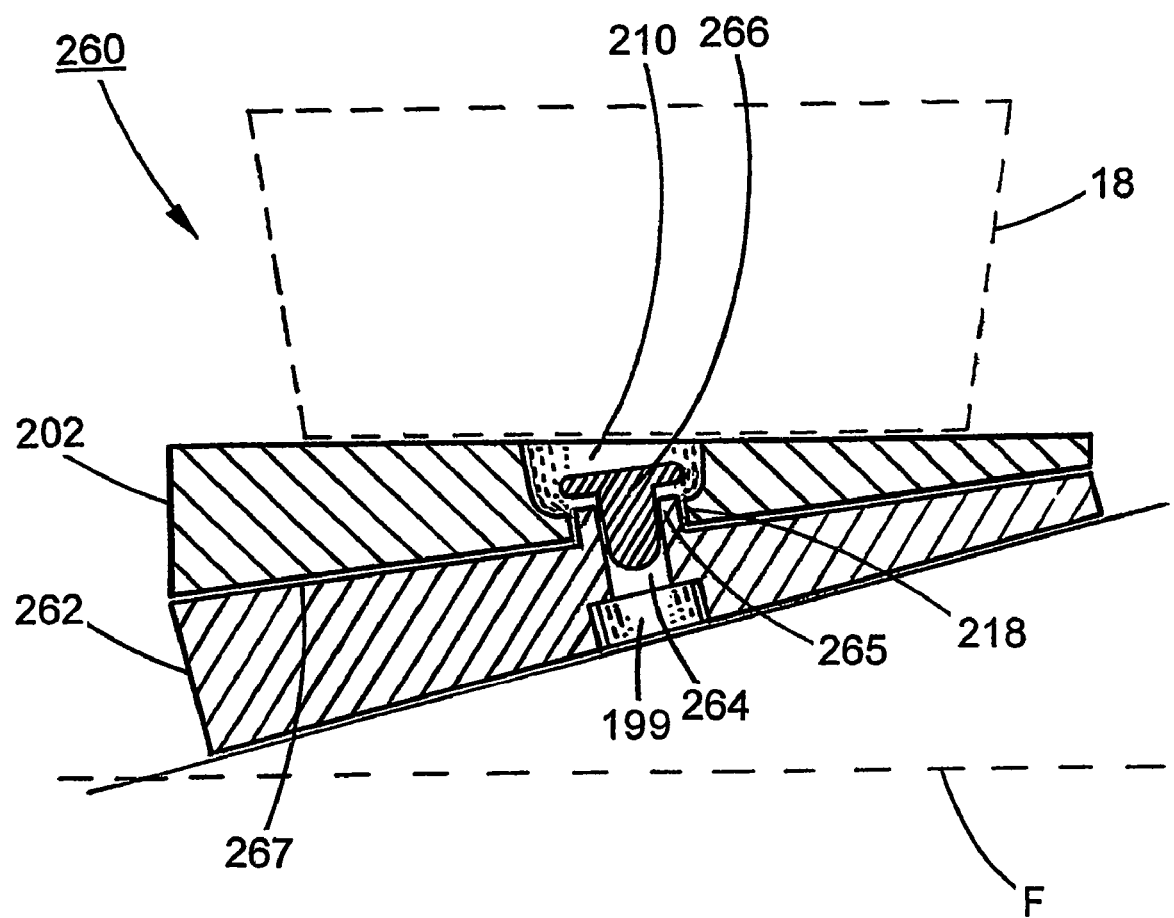
FIG. 14 is a cross sectional view of an eleventh alternate embodiment of a leveling assembly.
Figure 15:
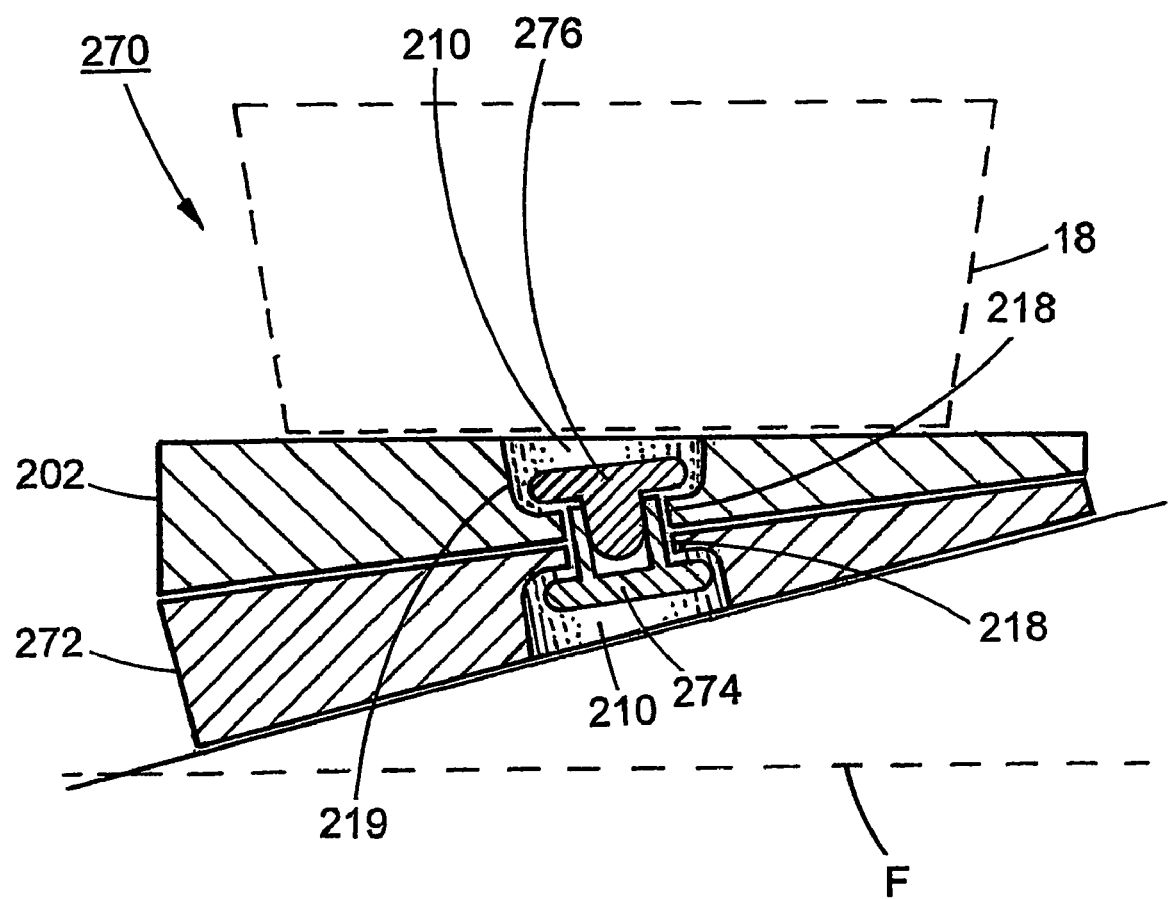
FIG. 15 is a cross sectional view of a twelfth alternate embodiment of a leveling assembly.

It is preferred that the two leveling elements of the leveling pedestal are not fastened to each other or to the free standing object, as free rotation of the elements with respect to one another is required. However, the elements may be adapted with cooperating connecting members for connecting adjacent elements in loose proximity to one another. Various alternative embodiments equipped with such cooperating connecting members are shown in FIGS. 13-15.

Figure 13:
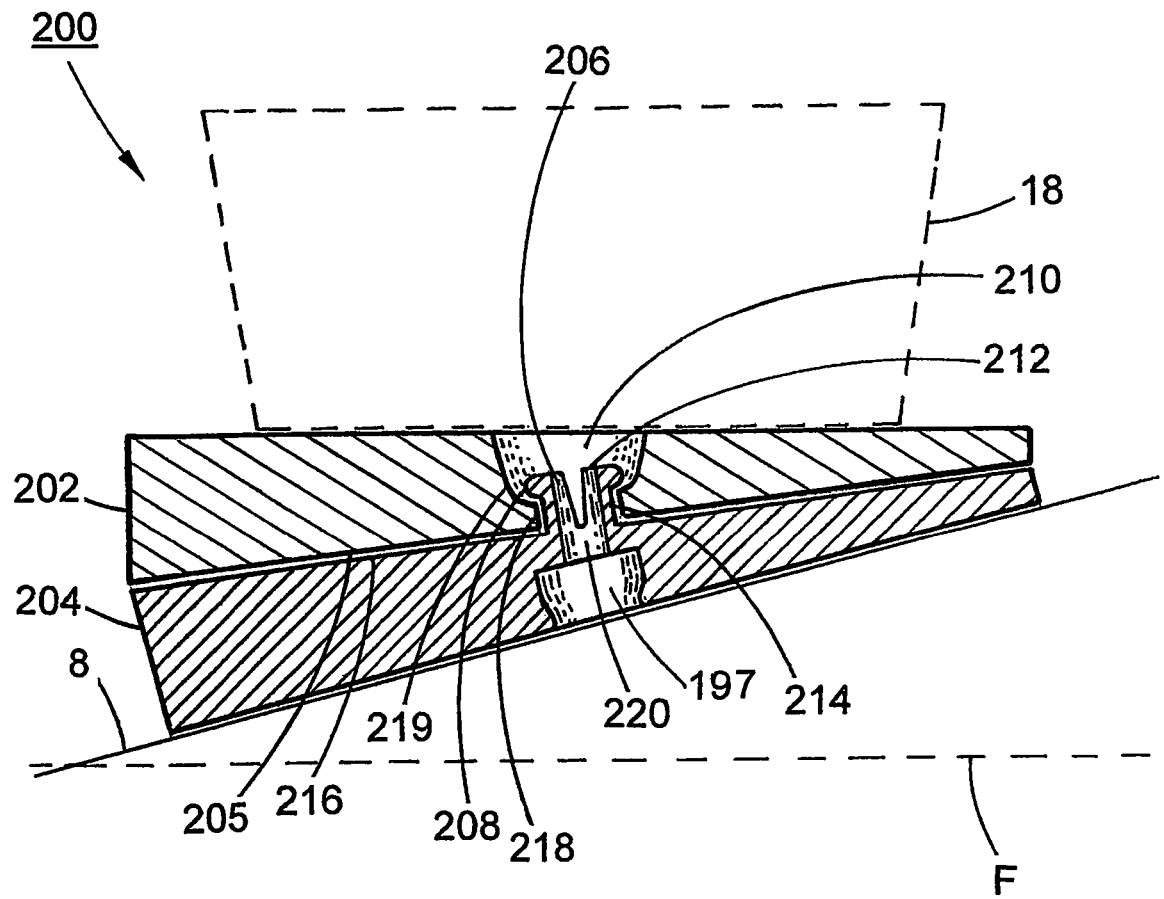
FIG. 13. is a cross sectional view of a tenth alternate embodiment of a leveling assembly.

FIG. 13 shows a leveling pedestal 200 having a first leveling element 202 and a second leveling element 204. The elements 202, 204 are held in loose proximity in a manner allowing unimpeded rotation, by way of cooperating connecting members. The cooperating connecting members comprise male and female connecting elements. The male element is a central snap-fit projection 206 formed by at least a pair of rigidly flexible rounded rib-form flanges 208 projecting from, and perpendicular to, top surface 216 of second element 204. The snap-fit projection has a neck 214 and head 212. The flanges 208 are semi-cylindrical, such that the snap-fit projection as a whole is substantially cylindrical. The rounded edges of the rounded rib-form flanges 208 make insertion and removal of the male element into the female element easier. A central drainage channel 220 passes between the flanges 208 and through the leveling element 204 to central receptive opening 197.

The female element is a central cylindrical opening 210 having a first portion 218 and a second portion 219. Cylindrical opening 210 is substantially perpendicular to lower surface 205 of first leveling element 202. The first portion 218 has a smaller diameter than the second portion 219 and than the head 212 of the snap-fit projection. The first portion is sized to be larger in diameter than the neck 214 of the snap-fit projection such that the two fit loosely together when connected. The second portion 219 is sized to be larger in diameter than the head 212 of the snap-fit projection such that head 212 fits loosely within second portion 219 when the first and second leveling elements 202, 204 are connected.

When first leveling element 202 is placed atop second leveling element 204 force must be exerted in order to "snap" the two together. Once connected, the connecting members act to prevent complete separation of the two elements 202, 204 in the vertical direction, while allowing unimpeded rotation of the two relative to one another.

It is also contemplated that other snap-fit designs would be suitable provided the leveling elements are held together in loose proximity to allow unrestricted rotation relative to one another. For example, the male central snap-fit projection could be a single semi-circular flange having a head and neck portion.

FIG. 14 shows a further alternative embodiment of a leveling pedestal 260 equipped with cooperating connecting members. A first leveling element 202 is seated atop a second leveling element 262. A hollow cylindrical projection 265 projects perpendicularly from top surface 267 of second element 262. The cylindrical projection is dimensioned to fit loosely within the first portion 218 of central cylindrical opening 210. Cylindrical channel 264 passes from the topmost surface of cylindrical projection 265 through second leveling element 262 to central receptive opening 199. A t-shaped cylindrical plug 266 is inserted into cylindrical channel 264 in order to hold the first and second elements 202, 262 in loose proximity to one another. The plug 266 may be adapted for a friction fit in cylindrical channel 264 or both the plug and the channel may be threadingly engaged.

FIG. 15 shows yet a further alternative embodiment of a leveling pedestal 270 having a first leveling element 202 and a second leveling element 272. Both first and second leveling elements 202 and 272 have a central cylindrical opening 210 having a first portion 218 and a second portion 219. Male and female fasteners 276 and 274 loosely connect the elements allowing unimpeded rotation. These may take the form of a nut and bolt, or as shown, a male portion 276 lodged within a female portion 274, so that the male and female portions form a unit which is unconnected to either element but which holds the elements loosely proximal and allows their unimpeded rotation.

As mentioned earlier, the overall shape of the wedge-like leveling elements may be varied. The pedestal, when viewed from above, could be any number of shapes, including but not limited to circular, rectangular, square, octagonal, or rhomboid. For example, rather than being cylindrical, the pedestal could be cube-shaped. Similarly, the shape of the surfaces of the leveling elements may vary and need not be identical for a leveling element or between leveling elements forming an assembly. For example, a leveling element may have a square lower surface and a circular upper surface with the perimeter of the element blending between the two. The main feature is that the leveling elements be wedge-like such that the planes of the upper and lower surfaces intersect at an angle, and that the elements may be seated on, and rotatable relative to, one another. Full rotation through 360 degrees is preferred, however fixed amounts such as 180 degrees or less depending on the use to be made of the leveling assembly is possible. The leveling elements may also be equipped with features permitting drainage of any liquids that should happen to accumulate.

The top leveling element of a pedestal may also be equipped with a spirit level. This could take the form of a circular channel in the top surface of the element into which a liquid may be placed. The elements may be rotated relative to each other and to the slope upon which they are placed until the liquid is level within the circular channel.

Alternative spirit level designs may also be formed into a leveling element, such as a star-design indent or even a circular concave depression.

The free-standing receptacle or like free-standing object placed on the seat does not require any point of support other than its seat on the leveling pedestal and no separate means fastening the free-standing receptacle to the pedestal. The leveling elements are held in their relationship to each other by gravitational forces without need for a fastening means. Accordingly, the positioning of the leveling elements in relation to each other is easily changed allowing the user to make both large and fine adjustments in the process of finding a satisfactory level.

If the angle of slope of the surface on which the pedestal is placed is altered by erosion, frost or settling, the leveling pedestal can be easily adjusted to provide a greater or lesser angle between the topmost surface of the pedestal and the lowermost surface, so that the user's desired orientation of the free-standing receptacle is re-created.

Preferably, as shown in FIG. 1 through FIG. 8, each leveling element has one circular plane and one plane biased from the circular, so that it is slightly elliptic. In this case, the user will preferably place elliptic surfaces in contact or alternatively circular surfaces in contact. In a second form of the invention, illustrated in FIG. 9, both surfaces of each leveling element are substantially circular, providing for more exact centering of the leveling elements one on the other and more exact alignment of the surfaces at their circumferential edges. This exact alignment enhances tracking between stabilizing means at the outer or inner edge of the two interacting surfaces or within the span of those surfaces as the leveling elements are rotated in relation to each other.

Use of two leveling elements together is foreseen as the preferred method but it is also possible to use three or more leveling elements to form a larger leveling pedestal adapted to compensate for a steeper slope. Use of a third or more leveling elements as part of the leveling pedestal can increase the height of the pedestal and can increase the maximum degree of slope for which a given leveling pedestal compensates.

It will also be appreciated that the seat provided by the leveling pedestal may be smaller, same-size or larger than the base of the free-standing receptacle or like free-standing object positioned on the uppermost surface of the leveling pedestal. Similarly, the dimensions of the surfaces of the leveling elements forming a given leveling assembly may be different.

It will be appreciated by those skilled in the art that the preferred and alternative embodiments have been described in some detail but that certain modifications may be practiced without departing from the principles of the invention.

What is claimed is:

1. An adjustable leveling assembly for supporting and leveling a free-standing object comprising:
   a first leveling element having an upper surface and a lower surface;
   a second leveling element having a top surface and a bottom surface and a central cylindrical opening passing therethrough;
   cooperating guiding members on each of said first and second leveling elements;
   said upper surface lying substantially in a first plane and being adapted to support said free-standing object;
   said lower surface lying substantially in a second plane and being adapted to be in contact with said top surface;
   said top surface lying substantially in a third plane and being adapted to be in contact with said lower surface and to support said first leveling element, said first leveling element being adapted to be seated on said second leveling element and to be rotated in relation thereto;
   said bottom surface lying substantially in a fourth plane and being adapted to be placed in contact with a further surface;
   said first and second planes intersecting at a first intersection angle, and said third and fourth planes intersecting at a second intersection angle;
   whereby rotation of said first and second leveling elements in relation to one another varies the relative angle between said first plane and said fourth plane; and
   wherein said guiding members comprise a circular lip projecting and extending outwards from said top surface adjacent said central cylindrical opening and a circular channel recessed in said lower surface, wherein said circular lip is adapted to fit within said circular channel.

2. An adjustable leveling assembly for supporting and leveling a free-standing object comprising:
   a first leveling element having an upper surface and a lower surface;
   a second leveling element having a top surface and a bottom surface;
   cooperating guiding members on each of said first and second leveling elements;
   said upper surface lying substantially in a first plane and being adapted to support said free-standing object;

said lower surface lying substantially in a second plane and being adapted to be in contact with said top surface;

said top surface lying substantially in a third plane and being adapted to be in contact with said lower surface and to support said first leveling element, said first leveling element being adapted to be seated on said second leveling element and to be rotated in relation thereto;

said bottom surface lying substantially in a fourth plane and being adapted to be placed in contact with a further surface;

said first and second planes intersecting at a first intersection angle, and said third and fourth planes intersecting at a second intersection angle;

whereby rotation of said first and second leveling elements in relation to one another varies the relative angle between said first plane and said fourth plane; and wherein:

said guiding members comprise a substantially circular lip projecting from said lower surface and an outer perimeter of said top surface;

said circular lip having radially inner and outer surfaces and having a lower edge, said lower edge being parallel to said upper surface and said lower surface being angled and recessed relative to said circular lip;

said top surface being substantially circular; and said radially inner surface having a radius that is larger than a radius of said top surface.

3. The leveling assembly of claim 2 further comprising a perimeter wall depending from said upper surface.

4. An adjustable leveling assembly for leveling a free-standing object on a slope comprising:

a top and a bottom element, said elements being generally wedge shaped in longitudinal section and being rotatable in relation to one another, said assembly having an uppermost surface lying in a first plane and a lowermost surface lying in a second plane, rotation of at least one of said elements relative to the other varying a relative intersection angle between said first plane and said second plane, said uppermost surface providing a seat for said free-standing object and said lowermost surface being in contact with said slope;

co-operating guiding members on each of said top and bottom leveling elements; and wherein:

said guiding members comprise a substantially circular lip projecting from said top element and an outer perimeter of said bottom element, said circular lip having radially inner and outer surfaces and a lower edge, said lower edge being parallel to said uppermost surface and a lower surface of said top element being angled in relation to said lower edge;

said bottom element is substantially cylindrical having a radius; and said radially inner surface has a radius that is larger than said radius of said bottom element.

5. The leveling assembly of claim 4 further comprising a perimeter wall depending from said upper surface.

* * * * *